(No Model.)

A. M. WARD.
FACIAL MEASURE.

No. 505,496. Patented Sept. 26, 1893.

Witnesses
O. B. Barringer
John F. Miller

Inventor
Albert M. Ward
By his Attorney
Newell S. Wright

UNITED STATES PATENT OFFICE.

ALBERT M. WARD, OF DETROIT, MICHIGAN, ASSIGNOR TO GEORGE JOHNSTON, OF SAME PLACE.

FACIAL MEASURE.

SPECIFICATION forming part of Letters Patent No. 505,496, dated September 26, 1893.

Application filed April 24, 1893. Serial No. 471,586. (No model.)

*To all whom it may concern:*

Be it known that I, ALBERT M. WARD, a citizen of the United States, residing at Detroit, county of Wayne, State of Michigan, have invented a certain new and useful Improvement in Facial Measures; and I declare the following to be a full, clear, and exact description of the same, such as will enable others skilled in the art to which it appertains to make and use the same, reference being had to the accompanying drawings, which form a part of this specification.

My invention relates to certain new and useful improvements in a facial measure, to get different heights of bridges in spectacle frames and the like, and the proper adjustment of the eye glass frames as may be required in any specific case.

It consists of the devices and appliances, their construction, combination and arrangement as hereinafter specified and claimed, and illustrated in the accompanying drawings, in which—

Figure 1:
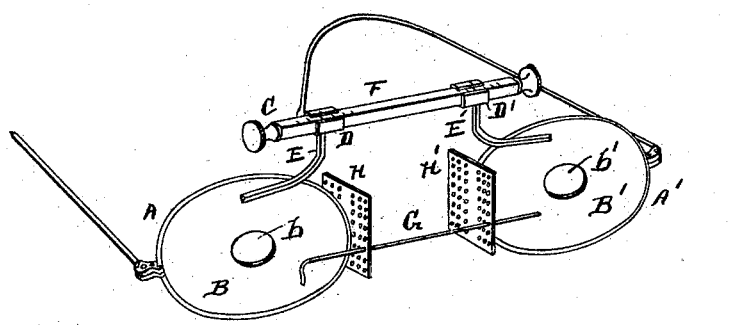
Figure 2:
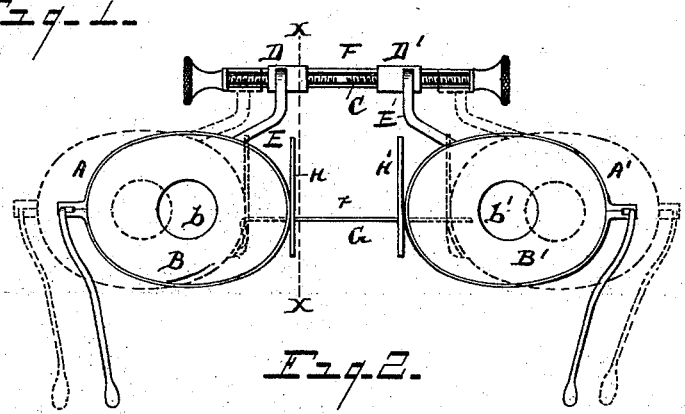
Figure 3:
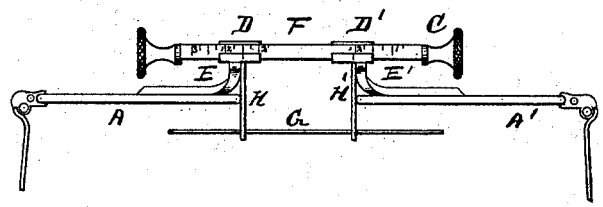
Figures 4, 5:
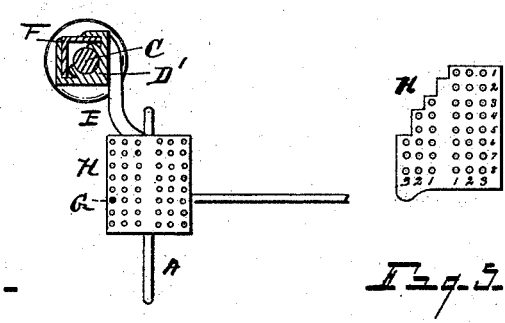

Figure 1 is a view in perspective, illustrating features of my invention. Fig. 2 is a front elevation. Fig. 3 is a plan view, and Fig. 4 is a vertical cross section on the line $x$—$x$ Fig. 2. Fig. 5 is a detail view of one of the perforated plates provided with numerals.

I carry out my invention as follows:

A and A' represent two eye wires or eye frames, having perforated eye plates B B' inserted therein. The orifices "$b$," "$b'$" in said plates are for the proper adjustment of the iris of the eyes in different persons. I do not, however, limit myself to the employment of these plates.

C is a screw provided with right and left hand threads, working in any suitable bearings D and D', supported in any suitable manner, as by arms E and E' secured upon the eye plates.

F is a scale bar, which may be supported upon said bearings. By this construction, it is evident, that the two eye frames may be adjusted laterally as required. In this manner said eye frames may be adjusted for the required pupillary distance.

H H' represent two perforated plates, each of which is engaged with one of the eye frames at their adjacent portions.

G is a rod, which may be engaged in any of the perforations of said plates to get the required height or location of the bridge in ordering spectacles. It will be perceived that said perforated plates may be adjusted until they touch the nose, to get the width of the nose, and the rod may be adjusted in or out, up or down, as may be required, to fix the proper location of the bridge. Said perforated plates are preferably engaged upon the eye frame intermediate their front and rear edges respectively. As shown, there are three vertical rows of holes or perforations each side the line of union of the said plates with the eye frames. I do not, however, limit myself precisely to this arrangement.

In fitting spectacles the required facial measurements may thus be made in a simple and convenient manner and with great accuracy.

I do not limit myself solely to making the eye frames laterally adjustable, as by the screw mentioned, as I contemplate the employment of the perforated plates H, H' for the purpose described whether the eye frames be laterally adjustable or not.

I do not limit myself to any particular way of supporting the perforated plates H H'. Instead of fastening them to the eye frame they might be engaged with the arms E E'.

As shown in Fig. 5 numerals may be applied to the perforated plates laterally and vertically, to indicate the point of engagement of the rod with said plates. The perforations may for convenience be spaced a distance of one sixteenth of an inch or any other distance desired.

While perforated plates are preferably employed to locate the proper position of the bridge, I do not limit myself to the perforations alone, as the plates H H' are in the nature of measuring plates and they may be one or both indented to engage a suitable rod.

What I claim as my invention is—

1. In a facial measure, the combination of eye frames, and perforated plates in connection therewith, located adjacent to the inner portions of the eye frame, substantially as described.

2. In a facial measure, the combination of eye frames, perforated measuring plates at the adjacent portions of the eye frames, and a rod to engage said plates, substantially as described.

3. In a facial measure, the combination of eye frames, measuring plates located at the adjacent portions of the eye frames, and means for laterally adjusting the measuring plates substantially as described.

4. In a facial measure, eye frames having perforated plates in connection therewith at their adjacent portions, and a screw to adjust the frames laterally, substantially as described.

5. In a facial measure, eye frames having perforated plates in connection therewith at their adjacent portions and extending substantially at right angles thereto, a screw to adjust said frames laterally, and a scale bar to indicate the lateral adjustment, substantially as described.

In testimony whereof I sign this specification in the presence of two witnesses.

ALBERT M. WARD.

Witnesses:
N. S. WRIGHT,
JOHN F. MILLER.